July 22, 1941.  E. J. BUCKNAM  2,249,743

SAW SHARPENING APPARATUS

Filed Oct. 13, 1939

Inventor
E. J. Bucknam
By George P. Mackue

Patented July 22, 1941

2,249,743

UNITED STATES PATENT OFFICE 2,249,743

SAW SHARPENING APPARATUS

Elroy J. Bucknam, Toronto, Ontario, Canada

Application October 13, 1939, Serial No. 299,345

7 Claims. (Cl. 76—37)

This invention relates to the sharpening of the teeth of circular saws, and particularly circular saws of the inserted tooth type. The common practice is to sharpen the teeth by filing with an ordinary file, but this is a slow process and much difficulty is experienced in getting the teeth exactly alike and in maintaining the perfectly flat work engaging edge, which is so desirable due to the tendency of the point of the tooth to bend outwardly to one side or the other if the edge at one side is even a small amount in advance of the other.

My object, therefore, is to devise apparatus which is adapted to grind the under side of the teeth by means of which all the teeth will be similarly ground, and in which the working face of each tooth will be perfectly flat.

Figures 1, 5:
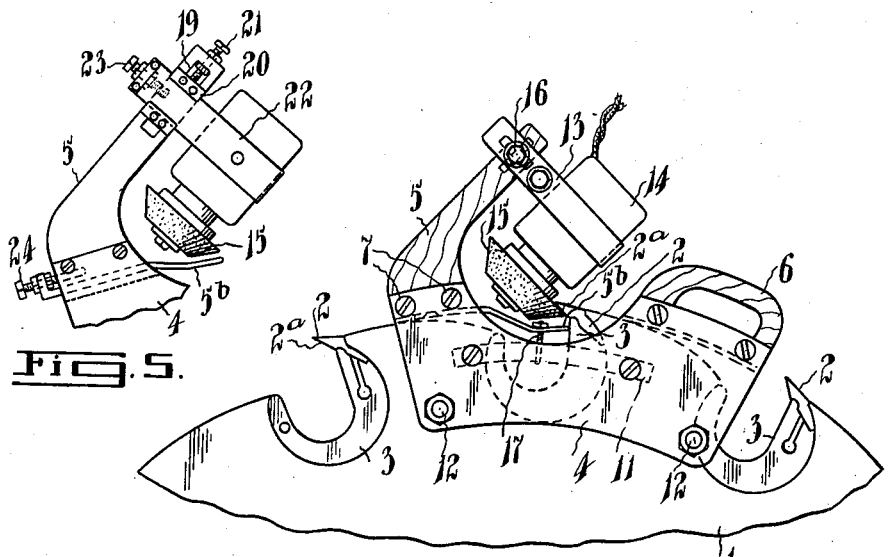
Figure 2:
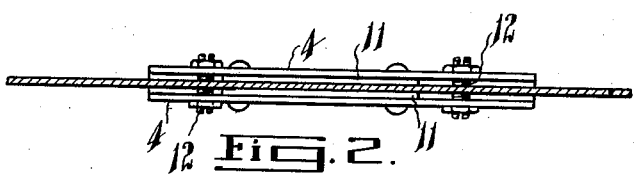
Figures 3, 4:
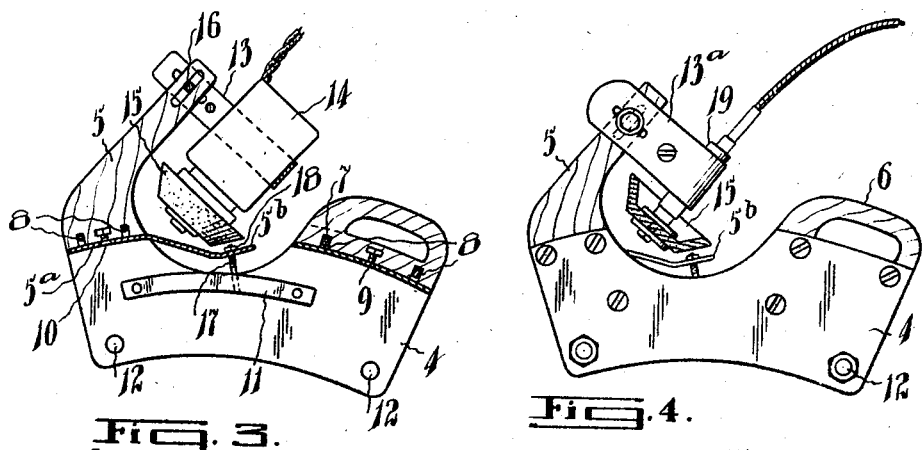

I attain my object by means of the constructions hereinafter described and illustrated in the accompanying drawing in which Fig. 1 is a side elevation of the apparatus applied on a saw;

Fig. 2 a view of the under side of the apparatus, the motor and grinding wheel being omitted;

Fig. 3 a longitudinal vertical section of the apparatus;

Fig. 4 a side view of a modified form;

Fig. 5 a detail illustrating a still further modification.

In the drawing like numerals of reference indicate corresponding parts in the different figures.

1 indicates a circular saw, which is provided with a series of recesses about its periphery to receive the teeth 2 which are locked in place by the retainers 3. The teeth project slightly beyond the periphery of the saw, and cutting is effected by the under surface 2ª, and it is with the grinding or sharpening of this surface with which the invention is particularly concerned.

The apparatus comprises a pair of side plates 4, which are held in spaced relation by a grinder carrier 5 and a handle 6. The grinder carrier, the handle and the side plates are secured together by screws 7 passing through alined holes in each. The holes in the grinder carrier and the handle are formed as slots 8, thus permitting the grinder carrier and the handle to be tilted, within the limits of the length of the slots, relative to the side plates, as illustrated in dotted lines in Fig. 3. The handle is provided with a metal facing plate which is secured to the handle by a screw 9 and forms a bottom for the slots 8 therein.

Similarly the grinder carrier 5 is provided with a metal facing plate 5ª carried by a screw 10 and forming a bottom for the slots 8 in said carrier. The facing plate 5ª is provided with an extension 5ᵇ, the end of which, as will be seen in Fig. 1, engages the tooth retainer to position the apparatus relative to the tooth to be ground.

Secured to the inside of each side plate is a positioning strip 11, the adjacent surfaces of which are spaced apart sufficiently to receive between them an ordinary saw. Also mounted on the side plates are adjustable positioning screws 12 which co-operate with the positioning strips to prevent wobbling of the apparatus on the saw.

Mounted on the grinder carrier by means of a clamping bracket 13 is an electric motor 14 on the shaft of which is mounted a grinding wheel, 15, shaped as a hollow truncated cone having an open large end, the base of the wall engaging the tooth surface 2ª as shown in Fig. 1.

In order to adapt the apparatus for different sizes of saw teeth, the carrier 5 and the bracket 13 are both slotted (see Fig. 3) and the parts are secured together in the desired position by means of a clamping screw 16.

To effect the grinding operation, the device is positioned as shown in Fig. 1. When grinding has been completed, the device is moved to the next tooth. The extension 5ᵇ serves to prevent accidental contact of the grinding wheel with the adjacent tooth during the shifting operation. To regulate the height of this extension a threaded post 17 extends from one of the strips 11 through an opening in the extension 5ᵇ and has an adjusting nut 18 thereon.

In Fig. 4 is shown a sharpener intended for hand operation. The grinding wheel is secured on the end of a shaft rotatable in a bearing 19 carried by the clamping bracket 13ª, and this shaft is connected to and driven by a Bowden wire device, which in turn is operated by a hand wheel or other suitable device not shown.

In Fig. 5 is shown a more elaborate method of effecting the adjustment between the motor and the grinder carrier 5. In a guideway 19 in the carrier is mounted a slide 20, the position of which may be adjusted by means of a screw 21. On this guide in turn is formed a guideway for the motor carrier 22, which guide is moved transversely of the carrier by means of an adjusting screw 23.

In Fig. 5, the facing place 5ᵇ is arranged to slide to regulate the amount of extension of the positioning guard extension thereof. This adjustment is effected by means of an adjusting screw 24.

What I claim as my invention is:

1. In saw grinding apparatus, the combination of a saddle-back frame adapted to engage the periphery of the saw at spaced points and having depending sides forming between them a guideway to receive the toothed edge of a saw, said frame having an opening in its head intermediate its points of engagement with the saw periphery and through which a saw tooth may project; a grinding wheel carried by said frame and extending into said opening to engage the cutting edge of a tooth projecting through said opening; means for rotating said grinding wheel; and a cam member extending from the forward part of the frame downwardly and rearwardly into said opening below the grinding wheel and adapted as the frame is moved forwardly, to lift said frame to carry the grinding element clear of the next saw tooth in advance and into position to engage the portion of said advanced tooth to be ground when the movement of the frame is reversed.

2. In saw grinding apparatus, the combination of a saddle-back frame having depending sides forming between them a guideway to receive the toothed edge of a saw, said frame having an opening in its head intermediate its ends through which a saw tooth may project; a grinding wheel carried by said frame and extending into said opening to engage the cutting edge of a tooth projecting through said opening; means for rotating said grinding wheel; and a stop on said frame adapted to engage the forward edge of the tooth below the grinding wheel to limit the grinding operation.

3. In saw grinding apparatus, the combination of a saddle-back frame having depending sides forming between them a guideway to receive the toothed edge of a saw, said frame having an opening in its head intermediate its ends through which a saw tooth may project; a grinding wheel carried by said frame and extending into said opening to engage the cutting edge of a tooth projecting through said opening; means for rotating said grinding wheel; and a guide member extending from the forward part of the frame downwardly and rearwardly into said opening below the grinding wheel, the end of said guide member forming a stop to engage the forward edge of the tooth below the grinding wheel to limit the grinding operation.

4. In saw grinding apparatus, the combination of a saddle-back frame having depending sides forming between them a guideway to receive the toothed edge of a saw, said frame having an opening in its head intermediate its ends through which a saw tooth may project; a grinding wheel carried by said frame and extending into said opening to engage the cutting edge of a tooth projecting through said opening; means for rotating said grinding wheel; a guide member extending from the forward part of the frame downwardly and rearwardly into said opening below the grinding wheel, the end of said guide member forming a stop to engage the forward edge of the tooth below the grinding wheel to limit the grinding operation; and means for adjusting said guide member longitudinally of said opening.

5. A saw gringing apparatus adapted for travel peripherally of a saw and comprising a carrier extending over the saw edge and slidably engaging the sides of the saw, a tooth grinding element mounted on the carrier in position to engage the part of the saw tooth to be ground, means adapted as the carrier frame is pushed forward on the saw for automatically moving the carrier frame outwardly relative to the periphery of the saw to carry the grinding element clear of the next saw tooth in advance and into position to engage the portion of the tooth to be ground when the movement of the carrier is reversed.

6. A saw grinding apparatus adapted for travel peripherally of a saw and comprising a carrier frame extending over the saw edge and having slidable contact with the sides of the saw, a tooth grinding element mounted on the carrier in position to engage the part of the tooth to be ground, a cam member for automatically moving the carrier frame outwardly relative to the periphery of the saw as the carrier frame is manually pushed forward to carry the grinding element clear over the next saw tooth in advance and into position to engage the part to be ground when the movement of the carrier is reversed and for gauging the extent of the grinding operation.

7. A saw grinding apparatus adapted for travel peripherally of a saw, and comprising a carrier extending over the saw edge and slidably engaging the sides of the saw, a tooth grinding element mounted on the carrier in position to engage the part of the saw tooth to be ground, means adapted as the carrier frame is pushed forward on the saw for automatically moving the carrier frame to carry the grinding element outwardly relative to the periphery of the saw clear of the next saw tooth in advance and into position to engage the portion of the tooth to be ground when the movement of the carrier is reversed; and means for limiting such reverse movement to control the extent of the grinding operation.

ELROY J. BUCKNAM.